3,284,414
PROCESS FOR PREPARING WATER-SOLUBLE COPOLYMERS OF ACRYLIC ACIDS AND N-VINYL HETEROCYCLIC MONOMERS IN A HALOGENATED HYDROCARBON
Sherman C. Lashua and Billy B. Hibbard, Midland, and Dan E. Ranck, Sanford, Mich., assignors to The Dow Chemical Company, Midland, Mich., a corporation of Delaware
No Drawing. Filed May 23, 1963, Ser. No. 285,848
6 Claims. (Cl. 260—77.5)

This invention relates to water-soluble copolymers of an acrylic acid and an N-vinyl heterocyclic monomer and to a process for the synthesis thereof.

Within recent years water-soluble homopolymers of N-vinyl heterocyclic monomers such as N-vinyl-5-methyl-2-oxazolidinone, N-vinyl-3-morpholinone, and N-vinyl-2-pyrrolidone have attracted considerable attention because of many unusual and advantageous properties. For example, these polymers are excellent receptors for a wide variety of dyestuff. Hence, they are often used in the textile industry as dye acceptors particularly in the treatment of synthetic polymers, such as polyacrylonitrile, which are difficult to dye by conventional methods.

To improve certain desirable properties such as water solubility or compatibility with synthetic textile products, many copolymers of these N-vinyl heterocyclic monomers with other vinyl monomers have been prepared. For example, Drechsel in United States Patent 2,818,362 lists a large number of vinyl esters, amides, ethers, etc., as monomers for copolymerization with N-vinyl-2-oxazolidinone. However, no mention is made of direct copolymerization of this N-vinyl heterocyclic monomer with an acrylic acid.

The generic term "an acrylic acid" as used herein refers to an α-methylene carboxylic acid of the general formula:

$$CH_2=CRCOOH$$

wherein R is hydrogen, methyl, or ethyl, i.e., to acrylic, methacrylic or α-ethyl acrylic acids.

It is generally known that acids catalyze the decomposition of N-vinyl heterocyclic monomers through devinylation. Since the devinylation occurs rapidly under the normal conditions for aqueous or bulk polymerization, suitable direct copolymerization of acrylic acids and N-vinyl heterocyclic monomers has not been possible.

It has now been discovered that the acid-catalyzed devinylation can be essentially eliminated by using a liquid, bromine or chlorine containing aliphatic solvent as the polymerization medium. More particularly, the invention disclosed herein resides in the discovery that by using a liquid, aliphatic solvent containing bromine or chlorine as the polymerization medium, acrylic acids can be copolymerized with an N-vinyl heterocyclic monomer selected from the group consisting of: (1) N-vinyl-2-oxazolidinones of the general formula:

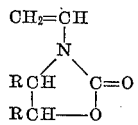

wherein each R individually is selected from the group consisting of hydrogen and $C_1$–$C_2$ alkyl radicals, (2) N-vinyl-3-morpholinones of the general formula:

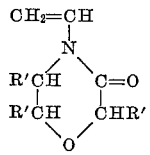

wherein each R' individually is selected from the group consisting of hydrogen and $C_1$–$C_4$ alkyl radicals, (3) N-vinyl-2-pyrrolidone, and (4) N-vinyl-2-piperidone, to give water-soluble copolymers. The preferred solvents are $C_1$–$C_4$ aliphatic compounds containing from 1 to 4 halogen atoms per molecule, each halogen individually being bromine or chlorine. The resulting addition copolymers are effective as dye acceptors and as flocculants.

The vinyl monomers employed in the present invention are well-known materials. Acrylic acids are widely used commercial products which can be prepared by a variety of methods including that described by Leathers and Woodward in United States Patent 3,051,747. The N-vinyl-2-oxazolidinone monomers are readily prepared by the transvinylation of 2-oxazolidinone with alkyl vinyl ether as described in greater detail by Walles et al. in United States Patent 2,919,279. Particularly desirable are the N-vinyl-5-methyl- and the N-vinyl-5-ethyl-2-oxazolidinones although other alkyl derivatives of N-vinyl-2-oxazolidinone may also be used. The synthesis of the N-vinyl-3-morpholinone monomers is described by Burgert in United States Patent 2,978,509. N-vinyl-2-pyrrolidone and N-vinyl-2-piperidone are well known.

To obtain the desired water-soluble copolymers, the initial monomer mixture should consist of at least 90 weight percent of the acrylic acid and N-vinyl heterocyclic monomers. However, minor amounts of up to 5 to 10 weight percent of other copolymerizable vinyl monomers may be incorporated. The relative proportions of acrylic acid and N-vinyl heterocyclic monomers in the initial monomer mixture can range from 99 to 1 mole percent of an acrylic acid with a complementary amount of one or more of the N-vinyl heterocyclic monomers. However, in practice it is often desirable to employ a monomeric mixture containing from about 20 to 80 mole percent of an acrylic acid and from about 80 to 20 mole percent of N-vinyl heterocyclic monomer.

Of critical importance in the invention described herein is the use of a liquid, halogenated aliphatic hydrocarbon as the medium for the copolymerization. Particularly convenient are $C_1$–$C_4$ halogenated aliphatic hydrocarbons having a normal boiling point within the range from 20° to 140° C. and containing from 1 to 4 halogen atoms per molecule, each halogen individually being chlorine or bromine. However, such solvents as methyl bromide or chloride which have a normal boiling point of less than 20° C. can also be used by employing a moderate pressure sufficient to maintain a liquid medium. In general, lower boiling solvents are preferred because of the greater ease with which the copolymeric product can be freed of residual solvent after isolation. Among the solvents which can be employed are: methylene chloride, 1,2-dichloroethane, 1,2-dichloropropane, 1,2-dichlorobutane, chloroform, 1,1,1-trichloroethane, 1,1,2-trichloroethylene, carbon tetrachloride; bromine containing compounds such as methylene bromide, 1,2-dibromoethane, n-propyl bromide, bromochloromethane, bromotrichloromethane, dibromochloromethane, 1-bromo-2-chloroethane, and 1-bromo-2-chloropropane.

In general, the novel copolymers are prepared by dissolving the desired monomeric mixture of an acrylic acid and N-vinyl heterocyclic monomer in a sufficient amount of halogenated solvent to give an initial monomer concentration of from about 5 to 25 weight percent. Addition polymerization is conveniently initiated by the thermal decomposition of a catalytic amount of a conventional free radical catalyst, such as azobisisobutyronitrile, lauroyl peroxide, benzoyl peroxide, or ditertiary butyl peroxide. Proportions of such catalysts ranging from about 0.05 to 6.0, and preferably from about 0.15 to 1.5 weight percent based on monomer content are advantageously used. Alternately, free radicals may be generated in the reaction mixture by irradiation with ultraviolet light, X-rays, or other sources of high energy radiation.

The polymerization temperature and reaction time will vary depending on such factors as the type and amount of catalyst, the particular solvent used, the concentration of reactants, etc. For example, with methylene chloride and a reactive catalyst like azobisisobutyronitrile, the copolymerization can be completed in about an hour or two at 40° C. whereas with a less active catalyst a higher temperature and a reaction time of 24 hours or more may be required. In general it is preferred to carry out the polymerization at a temperature in the range from about 20° C. to 100° C. although higher temperatures up to about 140° C. can be used. Often it is convenient to operate at the reflux temperature of the solvent. Below about 20° C. the polymerization is generally too slow for practical purposes while above about 140° C. side reactions often occur to give impure and less desirable copolymers.

It is evident to those skilled in the art, that variation of the reaction conditions within the limits described will influence the properties of the copolymer and particularly its molecular weight. To obtain high molecular weight copolymers, polymerization at the lower temperatures is preferred.

Although the copolymerization is most conveniently carried out under normal atmospheric pressure, it can be run at a moderately elevated or reduced pressure, if desired.

In practice, the desired amounts of monomeric reactants and catalyst are generally dissolved in the chosen solvent and the mixture heated with stirring to the desired polymerization temperature. Alternately, the free radical catalyst can be added after the polymerization temperature is reached. As polymerization proceeds, the reaction mixture normally becomes cloudy and the copolymer precipitates from solution. After a sufficient reaction time, the copolymer is isolated from the reaction mixture by filtration or other conventional means.

The resulting copolymers have an average molecular weight in the range from 5 to 10 thousand to several hundred thousand or more as estimated from the viscosity of dilute aqueous solutions. While the exact copolymer composition of the isolated solid copolymer will depend upon the specific monomers, monomer ratios, and polymerization conditions employed, analysis of a copolymer for total nitrogen establishes its composition. For example, typical copolymers obtained from several monomeric mixtures of acrylic acid and N-vinyl-5-methyl-2-oxazolidinone were found to contain from 3.26 to 6.95 weight percent N indicating that these copolymers contained from about 20 to 50 mole percent of polymerized N-vinyl-5-methyl-2-oxazolidinone.

The solid copolymers which are recovered from the reaction mixture are soluble or dispersible in water to the extent of at least about 0.1 to 1.0 weight percent. They are useful in textile processing as dye-receptors and dispersants particularly in the dyeing of polyacrylonitrile fibers. It has further been found that these copolymers are also effective as flocculants for finely divided solid dispersions. Furthermore, the free carboxylic acid groups in the copolymers can be neutralized if desired with a base such as ammonia, sodium hydroxide, potassium carbonate, trimethylamine, etc.

The following examples illustrate further the invention described herein, but are not to be construed as limiting its scope. Unless otherwise stated, all parts and percentages are by weight.

*Example 1.—Acrylic acid/VO–M copolymer*

A. A mixture of 3.6 parts (0.05 mole) of acrylic acid (AA) and 6.3 parts (0.05 mole) of N-vinyl-5-methyl-2-oxazolidinone (VO–M) was dissolved in 125 parts of ethylene dichloride. After adding 0.1 part of azobisisobutyronitrile as catalyst, the mixture was stirred and heated to the reflux temperature of about 84° C. After refluxing for about 1.5 hours, a white solid began to precipitate. Another 62.5 parts of ethylene dichloride were added and heating at reflux was continued for another 0.5 hour. The mixture was cooled and the solid copolymer recovered by filtration. The product was washed thoroughly with ethylene dichloride and then dried in vacuo at 60° C. for several hours. The dry solid copolymer, which was obtained in 55% yield, contained 4.65 wt. percent N, or about 30.0 mole percent of polymerized VO–M.

B. A 2.5 wt. percent aqueous solution of the AA/VO–M copolymer described in Example 1A was prepared and a sample of a polyacrylonitrile fiber tow soaked in the solution for 5 minutes at 100° C. The treated tow was washed well with cold water and dried at 150° C. for 0.5 hour. The resulting tow impregnated with the AA/VO–M copolymer showed rapid dye pick up when immersed in a 0.1% solution of Sevron Red for 5 minutes at 60° C. A similar rapid pick up was obtained with a 0.1% solution of Wool Fast Blue dye.

Another sample of the polyacrylonitrile fiber tow which was boiled in water containing no AA/VO–M copolymer, washed and dried as above, showed no dye pick up with either the Sevron Red or Wool Fast Blue dye solutions.

*Example 2.—Acrylic acid/VO–M copolymer*

A. A mixture of 10.8 parts (0.15 mole) of acrylic acid and 19.2 parts (0.15 mole) of VO–M was dissolved in 270 parts of methylene chloride and the resulting solution stirred and heated to reflux. To the mixture was then added 0.3 part of azobisisobutyronitrile and stirring at reflux was continued. After about 30 minutes, a white precipitate began to form. The reaction was continued at reflux for another 2½ hours before cooling the mixture and recovering the white precipiated copolymer by filtration. After washing the solid product with methylene chloride and drying, 14.0 parts of dry solid copolymer was obtained, a 46% yield. The copolymer contained 5.05 wt. percent N or about 32.5 mole percent of polymerized VO–M. A 1% aqueous solution of this copolymer was carefully neutralized with sodium hydroxide and the resulting solution was found to have a Ubbelohde viscosity of 33.0 cps. at 25° C.

B. The utility of the acrylic acid/VO–M copolymers as flocculants was demonstrated in the following manner. To a suspension of 5 g. of finely divided titanium dioxide in 95 ml. of water in a 100 ml. graduated cylinder was added 1 ml. of a 1% aqueous solution of the copolymer prepared in Example 2A. The graduate was capped and inverted 10 times to mix the contents thoroughly. Then it was placed in an upright position and the time required for the suspended solid to settle below the lower 25 ml. mark was determined.

In parallel tests the settling time for the suspension containing 1 ml. of the 1% copolymer solution was found to be 75 seconds; for a suspension containing 0.1 ml. of the 1% copolymer solution, 115 seconds; and for an untreated suspension, 165 seconds.

*Example 3.—Other copolymers*

Typical data for a number of other copolymers prepared from equimolar mixtures of monomers by the general method described in Examples 1 and 2 are presented in Table 1. These copolymers were all white solids with a solubility of at least 1% by weight in such hydroxylic solvents as water, alcohol, and aqueous acetone as well as in a mixture of equal volumes of methanol and benzene.

From the viscosity measurements, the molecular weight of these copolymers is estimated to range from 5 to 10 thousand to as high as several hundred thousand. In general, as expected, higher molecular weight products are obtained at the lower polymerization temperatures.

TABLE 1.—COPOLYMERS FROM EQUIMOLAR MIXTURES OF ACRYLIC ACIDS AND N-VINYL HETEROCYCLIC MONOMERS (VH)

| Ex. | Monomers [a] | | Conditions | | Copolymer | | | |
|---|---|---|---|---|---|---|---|---|
| | Acid | VH | Solvent | T, °C. | Weight Percent N | Mole Percent VH [b] | Yield, Percent | Viscosity,[c] cps. |
| 3-1 | AA | VO-M | $CH_2Cl_2$ | 42 | 5.05 | 32.5 | 46 | 33.0 |
| 3-2 | MAA | VO-M | $CH_2Cl_2$ | 42 | 2.74 | 15.8 | 38 | 37.0 |
| 3-3 | AA | VO-E | $CH_2Cl_2$ | 42 | 5.33 | 34.7 | 50 | 30.0 |
| 3-4 | AA | NVM | $CH_2Cl_2$ | 42 | 4.77 | 30.2 | 37 | |
| 3-5 | AA | NVM | $CHCl_3$ | 60 | 5.02 | 34.0 | 45 | 9.5 |
| 3-6 | AA | VO-E | $ClCH_2CH_2Cl$ | 82 | 4.54 | 28.5 | 60 | 2.0 |
| 3-7 | AA | NVM | $ClCH_2CH_2Br$ | 100 | 5.43 | 36.2 | 60 | 1.8 |

[a] Acrylic acids, acrylic acid (AA), methacrylic acid (MAA), N-vinyl heterocyclics (VH), N-vinyl-5-methyl-2-oxazolidinone (VO-M), N-vinyl-5-ethyl-2-oxazolidinone (VO-E), N-vinyl-3-morpholinone (NVM).
[b] Mole percent polymerized VH in copolymer.
[c] Ubbelohde viscosity of a 1% aqueous solution at 25° C. after neutralization with NaOH.

*Example 4.—Monomer ratios*

In a manner similar to that described in Examples 1 and 2, monomer compositions containing varying mole ratios of acrylic acid (AA) and N-vinyl-5-methyl-2-oxazolidinone (VO-M) were polymerized in several halogenated solvents. Typical compositions of the resulting solid copolymers are given in Table 2.

TABLE 2.—COPOLYMERS OF ACRYLIC ACID (AA) AND N-VINYL-5-METHYL-2-OXAZOLIDINONE (VO-M)

| Ex. | Conditions | | | Copolymer | | |
|---|---|---|---|---|---|---|
| | AA/VO-M [a] | Solvent | T, °C. | Weight percent N | Mole percent VO-M | Yield, percent |
| 4-1 | 3/1 | $CH_2Br_2$ | 82 | 3.56 | 21.8 | 46 |
| 4-2 | 1/1 | $CH_2Br_2$ | 82 | 4.42 | 27.4 | 41 |
| 4-3 | 1/3 | $CH_2Br_2$ | 82 | 6.95 | 48.7 | 33 |
| 4-4 | 1/1 | $CH_2Cl_2$ | 41 | 5.05 | 32.5 | 46 |
| 4-5 | 1/3 | $CH_2Cl_2$ | 41 | 5.64 | 37.0 | 23 |
| 4-6 | 1/1 | $ClCH_2CH_2Cl$ | 84 | 4.65 | 29.7 | 55 |
| 4-7 | 1/3 | $ClCH_2CH_2Cl$ | 84 | 6.24 | 42.6 | 38 |

[a] Monomer mole ratio.

*Example 5.—Halogenated solvents*

The effect of solvent on the copolymer composition was examined using an equimolar mixture of acrylic acid and VO-M in the general manner described in Examples 1 and 2. In each case the polymerization was carried out at reflux temperature. While the yields and copolymer compositions are not generally a function of the polymerization temperature, i.e., the solvent boiling point, it is evident that a superior product in terms of color is usually obtained with the lower boiling solvents. However, even the less desirable solvents such as $CCl_4$, ethylene dibromide and perchloroethylene are effective in minimizing devinylation of the N-vinyl heterocyclic monomer during polymerization.

TABLE 3.—INFLUENCE OF SOLVENT ON AA/VO-M COPOLYMERS

| Ex. | Conditions | | Copolymer | | | |
|---|---|---|---|---|---|---|
| | Solvent | T, °C. | Weight Percent N | Mole Percent VO-M | Yield, Percent | Color |
| 5-1 | $CH_2Cl_2$ | 41 | 5.05 | 32.5 | 46 | White. |
| 5-2 | $CHCl_3$ | 62 | 5.62 | 37.0 | 50 | Do. |
| 5-3 | $CH_2Br_2$ | 82 | 4.42 | 27.5 | 41 | Grey. |
| 5-4 | $ClCH_2CH_2Cl$ | 84 | 5.23 | 34.0 | 62 | White. |
| 5-5 | $ClCH_2CH_2Br$ | 100 | 5.07 | 32.7 | 28 | Do. |
| 5-6 | $CCl_4$ | 76 | ([a]) | ([a]) | 38 | Brown. |
| 5-7 | $Cl_2C=CCl_2$ | 120 | 5.00 | 31.5 | 81 | Do. |
| 5-8 | $BrCH_2CH_2Br$ | 128 | 3.26 | 19.3 | 21 | Do. |

[a] Not analyzed.

We claim:
1. In a process for preparing a copolymer of
(A) an acrylic acid selected from the group consisting of acrylic acid, methacrylic acid and α-ethylacrylic acid and
(B) an N-vinylheterocyclic monomer selected from the group consisting of:

(1) N-vinyl-2-oxazolidinones of the general formula:

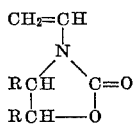

wherein each R individually is selected from the group consisting of hydrogen and $C_1$–$C_2$ alkyl radicals, (2) N-vinyl-3-morpholinones of the general formula:

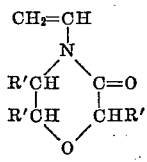

wherein each R' individually is selected from the group consisting of hydrogen and $C_1$–$C_4$ alkyl radicals,
(3) N-vinyl-2-pyrrolidone, and
(4) N-vinyl-2-piperidone, by a free radical vinyl addition polymerization in a liquid medium at 20°–140° C., the improvement which consists essentially in using as the polymerization medium a $C_1$–$C_4$ halogenated aliphatic hydrocarbon containing from 1 to 4 bromine or chlorine atoms and having a normal boiling point between 20° and 140° C.

2. The process of claim 1 wherein the solvent is methylene chloride.

3. The process of claim 1 wherein the solvent is 1,2-dichloroethane.

4. A process for the preparation of a water-soluble addition copolymer of an acrylic acid and an N-vinyl heterocyclic monomer which comprises dissolving in a liquid, $C_1$–$C_4$ halogenated aliphatic hydrocarbon having a normal boiling point not higher than 140° C. and containing from 1 to 4 bromine or chlorine atoms per molecule, a mixture of (A) an acrylic acid selected from the group consisting of acrylic acid, methacrylic acid, and α-ethyl acrylic acids, and (B) an N-vinyl heterocyclic monomer selected from the group consisting of:
(1) N-vinyl-2-oxazolidinones of the general formula:

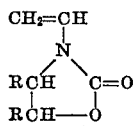

wherein each R individually is selected from the group consisting of hydrogen and $C_1$–$C_2$ alkyl radicals,
(2) N-vinyl-3-morpholinones of the general formula:

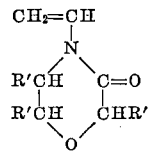

wherein each R' individually is selected from the group consisting of hydrogen and $C_1$–$C_4$ alkyl radicals,
(3) N-vinyl-2-pyrrolidone, and
(4) N-vinyl-2-piperidone;

initiating polymerization with a suitable free radical source; continuing said polymerization until the desired degree of polymerization is reached; and recovering the copolymeric product.

5. The process of claim 4 wherein the monomeric mixture consists of at least 90 weight percent of the acrylic acid and N-vinyl heterocyclic monomers, the relative proportions of these monomers being in the range from 99 to 1 mole percent of an acrylic acid monomer with a complementary amount of from 1 to 99 mole percent of an N-vinyl heterocyclic monomer.

6. The process of claim 4 wherein the monomeric mixture consists essentially of from 80 to 20 mole percent of an acrylic acid with a complementary amount of from 20 to 80 mole percent of an N-vinyl heterocyclic monomer.

References Cited by the Examiner
UNITED STATES PATENTS

| | | | |
|---|---|---|---|
| 2,818,362 | 12/1957 | Drechsel | 260—80.3 |
| 2,997,449 | 8/1961 | Armen et al. | 260—80.3 |
| 3,030,339 | 4/1962 | Tousignant | 260—77.5 |
| 3,044,873 | 7/1962 | Haas | 260—70.3 |
| 3,044,992 | 7/1962 | Hibbard et al. | 260—77.5 |

JOSEPH L. SCHOFER, *Primary Examiner.*

W. HOOVER, *Assistant Examiner.*